US008201605B2

(12) United States Patent
Preisner et al.

(10) Patent No.: US 8,201,605 B2
(45) Date of Patent: Jun. 19, 2012

(54) PRINTING MACHINE COMPRISING AN EMBOSSING DEVICE

(75) Inventors: Mario Preisner, Kirchheim/Teck (DE); Michael Zinke, Limburg (DE)

(73) Assignee: Manroland Druckmaschinen AG (DE)

( * ) Notice: Subject to any disclaimer, the term of this patent is extended or adjusted under 35 U.S.C. 154(b) by 1367 days.

(21) Appl. No.: 11/578,483

(22) PCT Filed: Apr. 13, 2005

(86) PCT No.: PCT/EP2005/003877
§ 371 (c)(1), (2), (4) Date: Jan. 5, 2007

(87) PCT Pub. No.: WO2005/100024
PCT Pub. Date: Oct. 27, 2005

(65) Prior Publication Data

US 2007/0284047 A1 Dec. 13, 2007

(30) Foreign Application Priority Data

Apr. 13, 2004 (DE) ......................... 10 2004 018 306
Apr. 29, 2004 (DE) ......................... 10 2004 021 102

(51) Int. Cl.

| | |
|---|---|
| ***B65C 11/02*** | (2006.01) |
| ***B65C 9/20*** | (2006.01) |
| ***B65C 9/22*** | (2006.01) |
| ***B29C 65/48*** | (2006.01) |
| ***B29C 65/52*** | (2006.01) |
| ***B32B 37/00*** | (2006.01) |
| ***B32B 38/14*** | (2006.01) |
| ***B32B 39/00*** | (2006.01) |
| ***B32B 43/00*** | (2006.01) |

(52) U.S. Cl. ......... 156/387; 156/580; 156/581; 156/582

(58) Field of Classification Search .................. 156/230, 156/235, 240, 384, 387, 540, 580, 581, 582; 101/33, 34
See application file for complete search history.

(56) References Cited

U.S. PATENT DOCUMENTS 3,858,977 A 1/1975 Baird et al.
4,369,082 A * 1/1983 Kerwin ......................... 156/238
4,465,538 A 8/1984 Schmoock (Continued)

FOREIGN PATENT DOCUMENTS

EP 0148601 A2 7/1985

(Continued)

OTHER PUBLICATIONS

"Prindor: Neue Technologie der Folienprägung—heriss oder kalt?", Deutscher Drucker, Deutscher Drucker Verlagsgesellschaft, Ostfildern, DE, Bd. 32, Nr. 14/15, Apr. 18, 1996, Seite G15, XP000584416 ISSN: 0012-1096 das ganze Dokument.

(Continued)

*Primary Examiner* — Sing P Chan
(74) *Attorney, Agent, or Firm* — Leydig, Voit & Mayer, Ltd

(57) ABSTRACT

The present invention provides a device for transferring image-forming layers from a transfer foil to printing sheets. The device includes a coating device for applying the image-forming layer of the transfer foil to an image area on the printing sheet that has been provided with an adhesive patter such that the image-forming layer is separated from a carrier layer of the transfer foil.

17 Claims, 3 Drawing Sheets

U.S. PATENT DOCUMENTS

| | | | | | |
|---|---|---|---|---|---|
| 5,156,638 | A | * | 10/1992 | Wirz | 101/142 |
| 5,207,855 | A | | 5/1993 | Nyfeler et al. | |
| 5,250,758 | A | | 10/1993 | Fjelstad et al. | |
| 5,318,660 | A | * | 6/1994 | Olsen et al. | 156/542 |
| 5,565,054 | A | | 10/1996 | Lappe et al. | |
| 5,603,259 | A | | 2/1997 | Gross et al. | |
| 5,618,378 | A | | 4/1997 | Cahill | |
| 5,775,225 | A | | 7/1998 | Saitou | |
| 5,891,289 | A | | 4/1999 | Zemel | |
| 6,112,651 | A | * | 9/2000 | Eitel et al. | 101/25 |
| 6,395,120 | B1 | | 5/2002 | Bradbury-Harris et al. | |
| 6,779,442 | B2 | | 8/2004 | Strasser | |
| 6,811,863 | B2 | | 11/2004 | Rizika et al. | |
| 6,909,444 | B2 | | 6/2005 | Ishida et al. | |

FOREIGN PATENT DOCUMENTS

| | | | |
|---|---|---|---|
| EP | 0195857 | A2 | 10/1986 |
| EP | 0414362 | A2 | 2/1991 |
| EP | 0441596 | A1 | 8/1991 |
| EP | 0569520 | | 11/1993 |
| EP | 0945280 | A2 | 9/1999 |
| EP | 1147893 | A2 | 10/2001 |
| GB | 1574908 | | 9/1980 |
| JP | 2004101834 | A1 | 4/2004 |
| WO | WO 9212859 | A1 | 8/1992 |
| WO | WO 9413749 | A1 | 6/1994 |
| WO | WO 0234521 | A1 | 5/2002 |
| WO | WO 2004041546 | A1 | 5/2004 |
| WO | WO 2005021276 | A1 | 3/2005 |

OTHER PUBLICATIONS

Emeriau L: “La dorure est <<Vernie >> Grace Au Dispositif Speedor D’Ecamo, La Dorure a Froid Sur Presse Offset” Caractere, CEP Information Professions. Paris, FR, vol. 45, No. 387/388, Oct. 4, 1994, pp. 146-147, XP000476375 ISSN: 0247-039X, p. 147, col. 1, line 12-line 25.

* cited by examiner

PRINTING MACHINE COMPRISING AN EMBOSSING DEVICE

FIELD OF THE INVENTION

The invention relates to a device for transferring imaging-forming layers from a transfer foil to printing sheets.

BACKGROUND OF THE INVENTION

Producing metallic layers on printed sheets using a foil transfer method is known. For example, EP 0 569 520 B1 describes a printing material and a printing apparatus that uses such a foil material. This reference relates to a sheet processing machine that has a feeder and a delivery unit. Printing units and a coating module are located between the feeder and delivery unit. An adhesive pattern is applied using a flat printing process in at least one of the printing units. This adhesive pattern is applied using a cold printing process and has a specific, imaging design. The coating module includes a foil guide that is located downstream of the printing unit and includes an impression cylinder and press cylinder. The foil guide is designed such that a foil strip or transfer foil can be guided from a foil supply roll through a transfer gap in the coating module between the impression cylinder and the press cylinder. The foil strip is rewound on the outlet side after leaving the coating module. The transfer foil includes a support layer to which image-forming layers, such as metallic layers (for example, made of aluminum) can be applied. A separating layer is provided between the metallic layer and the support foil. The separating layer ensures that the metallic layer can be removed from the support layer.

Each printing sheet is provided with an adhesive pattern as they are transported through the printing unit. The printing sheet is then guided through the coating module and the printing sheet resting upon the impression cylinder is brought into contact with the foil material via the press cylinder. In this case, the metallic layer positioned on the bottom of the transfer foil bonds tightly with the areas of the printing sheet supplied with the adhesive. As the printing sheet continues to move forward, the metallic layer adheres only in the area of the adhesive pattern. The metallic layer is then removed from the support film in the area of the adhesive pattern. The consumed transfer foil is then rewound. The printed sheet is delivered in the coated state.

Utilizing coating modules of this kind, for example, in printing units of printing machines is known. However, a disadvantage of these modules is that they cannot be utilized in a flexible manner.

BRIEF SUMMARY OF THE INVENTION

In view of the foregoing, an object of the present invention is to provide an apparatus that enables an image-forming layer, e.g., a metallic layer, to be transferred to a printed sheet in a more reliable, economical and precise manner. Thus, the apparatus can be readily used for a broad spectrum of applications.

According to the invention, a printing machine is made more flexible by integrating a foil transfer module therein. The foil transfer module can be designed as a part of a printing unit, as a separate work station, as an integrated work station, or as a convertible work station. Preferably the foil transfer module is locatable at different sites within the printing machine depending on the particular application.

Advantageously, several coating modules can be provided one after another within a sheet processing machine. This allows different image-forming layers or metallic layers within a design to be applied sequentially. With such an arrangement, the image-forming layers can be transferred one after another using a single adhesive pattern. It is also possible to apply a first image-forming layer using a first adhesive pattern and then to apply an additional adhesive pattern in overlapping relation to the first one that is used to apply a second image-forming layer.

A sheet turning apparatus also can be arranged upstream of the foil transfer module so that an image-forming layer can be applied to both the front and back side of a printing sheet.

To improve foil utilization, the transfer foil can be divided into one or more partial foil sheets or webs. This allows different types of foils to be used side-by-side.

To ensure the efficiency, the invention can include a foil advancing mechanism that is controlled so that the transfer foil is stopped when the image-forming layer is not transferred. As a result, the transfer foil can be controlled such that the foil advance is stopped upon passage of one of the gripper channels of the sheet-guiding impression cylinder with the press cylinder then sliding under the transfer foil.

To improve the coating properties, the imaging layer can be applied using so-called UV low-pressure inks. More specifically, the UV ink can be applied via the adhesive printing unit via an offset printing plate.

DETAILED DESCRIPTION OF THE INVENTION

Figure 1:
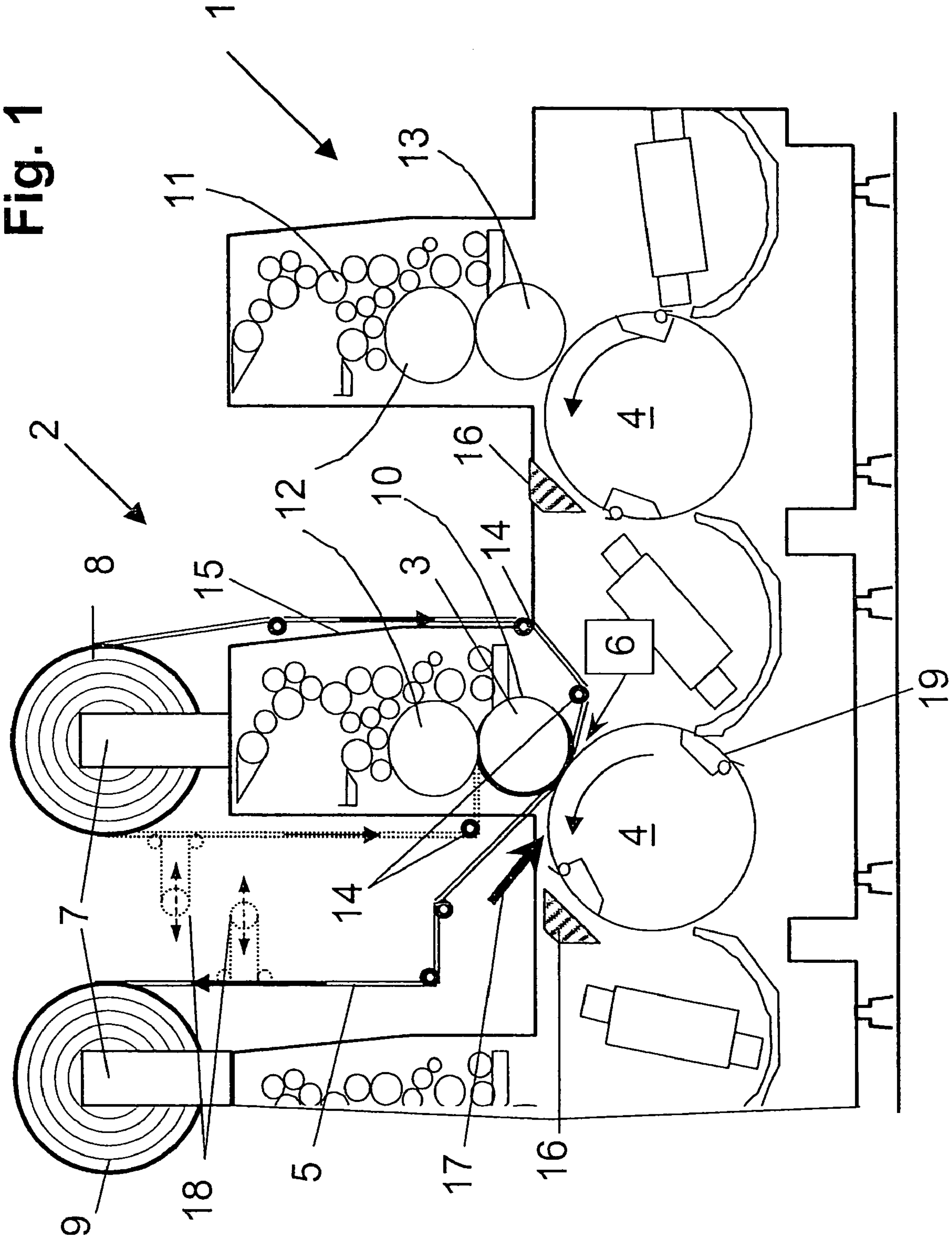
FIG. 1 is a schematic side sectional view of an exemplary printing machine including a foil transfer apparatus according to the present invention.

Referring to FIG. 1 of the drawings, a sheet processing machine is shown. In this case, the sheet processing machine comprises a printing press that includes at least two printing units. The two printing units can be used as described below to transfer an image-forming layer of a transfer foil to a printing sheet.

Figure 2:
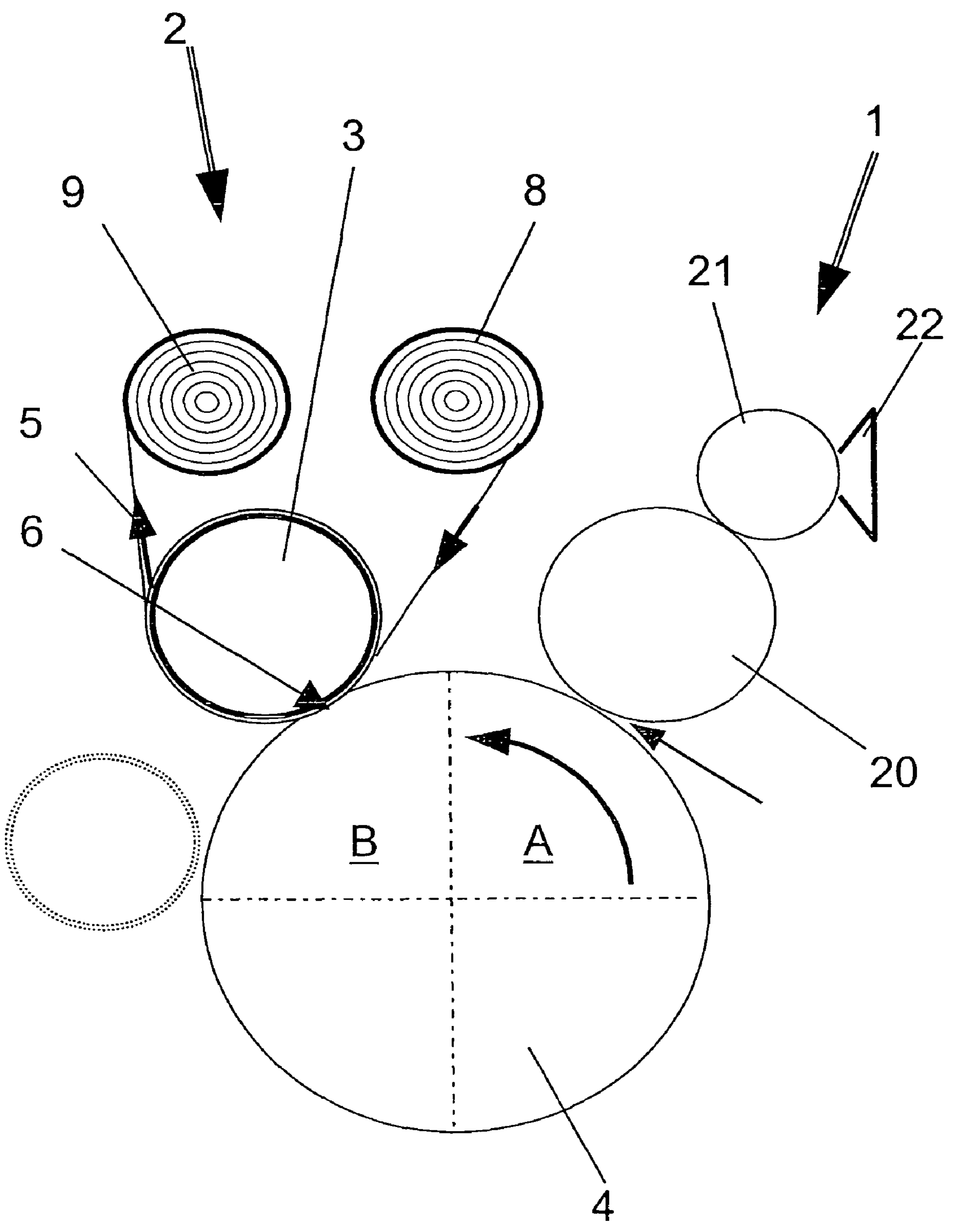
FIG. 2 is a schematic side view of an alternative embodiment of a coating module and associated application unit according to the present invention.

In a first step, an adhesive pattern is applied to a printing sheet to be coated. The application of the adhesive is carried out in an application unit 1, e.g., a conventional printing unit of an offset printing machine. In this case, the application unit 1 includes inking and dampening units 11, a pressure plate on a plate cylinder 12, a blanket or rubber cylinder 13 and an impression cylinder 4. Application units in the form of flexographic printing units or varnishing units also can be used. One variant of this type of embodiment is illustrated in FIG. 2. In the FIG. 2 embodiment, the adhesive is transferred to a forming cylinder 24 using a dosing system 21 via a screen roller 22 and a transfer roller 23. In this case, this cylinder uses a high pressure plate to apply the adhesive.

In a second step, a transfer foil 5 is passed through a transfer gap 6 together with a printing sheet with the transfer foil 5 in the transfer gap 6 being pressed against the printing sheet. In this case, a coating module 2 is used that can correspond to a printing unit, a varnishing module, a base unit or any other type of processing station of a sheet-fed offset printing machine. The transfer gap 6 in the coating module 2 is defined by a press cylinder 3 and an impression cylinder 4.

In this case, the press cylinder 3 can correspond to a blanket cylinder and the impression cylinder 4 can correspond to an impression cylinder of an otherwise known offset printing unit. In addition, the press cylinder 3 can correspond to a forming cylinder and the impression cylinder 4 can correspond to an impression cylinder of a varnishing module of a sheet printing machine. A so-called calendar unit also can be arranged downstream of the coating module if the coated printing sheet is to be rolled at elevated pressure to increase the adhesion of the coating or to increase the smoothness and gloss of the printing sheet.

A sheet guide for transfer foil 5 is arranged within the coating module 2. Transfer foils 5 that can be used have a multilayer structure. In particular, the transfer foils can have a support layer on which an imaging layer is applied over a separating layer. The separating layer is used to ease release of the imaging layer from the support layer. The imaging layer can be, for example, a metallic layer, a gloss layer, a textured layer, an inked layer or a layer containing one or more image patterns.

A foil supply roller 8 is arranged on the sheet feeder side of the coating module 2. The foil supply roller 8 includes a controllable rotary drive 7. The rotary drive 7 can continuously control supply of the transfer foil 5 to the coating module 2.

Guide elements 14, such as deflection or tension rollers, pneumatically actuated guide features, guide plates, etc. can be provided in the area of the foil inlet and outlet. As a result, the web or sheet of the transfer foil 5 can always be guided in a smooth, flat and undistorted manner and at the same tension relative to the press cylinder 3. The guide elements 14 can also includes aids for inserting the transfer foil 5. In this case, automatic draw-in or insertion aids for the web of the transfer foil 5 also can be used. In this way, the foil feed is simplified in the area of various printing unit protection elements 15 surrounding the coating unit 2. The protective function of the protection elements 15 is also fully maintained.

In the illustrated embodiment, the transfer foil 5 can be guided around the press cylinder 3 with the transfer foil 5 advantageously being supplied to and removed from the press gap 6 from only one side of the coating module 2 (see dashed line representation in FIG. 1). In contrast to what is shown in FIG. 1, depending on the available space on one side of the coating module 2, the foil sheet in this also can be guided so that the inlet web and the outlet web are positioned close to and parallel to each other. In another embodiment, the transfer foil 5 can extend past the press cylinder 3 in a substantially tangential manner or the transfer foil can be fed in and removed from the press gap 6 by winding around a small circumferential angle of the press cylinder. In this case, the transfer foil 5 can be supplied from one side of the coating module 2 and removed at the opposite side of the coating module 2.

A foil collection roller 9 is provided on the delivery side of the printing mechanism. The consumed foil material is rewound on the foil collection roller 9. In this case, a controllable rotary drive 7 can be provided to optimize production. The transfer foil 5 could also be moved by the rotary drive 7 on the outlet side and could be held taut on the inlet side by a brake.

For the image-forming layer transfer process, it is important that the surface of the press cylinder 3 (i.e., the surface of the blanket cylinder or forming cylinder) be equipped with a compressible dampening element. To this end, the press cylinder 3 is equipped with a press covering 10 or comprises as a cylinder having a corresponding coating. The press covering 10 or press coating can comprise for example, a plastic coating that is comparable to a rubber cloth or blanket. Preferably, the surface of the press covering 10 or press coating is very smooth. The surface of the press covering 10 can also be formed from on-adhesive substances or structures. For example, a relatively hard structure in the form of very tiny spherical elements can be used. The press covering 10 is held on the press cylinder 3 via a clamping or gripping element provided in a cylinder channel.

In order to improve the transfer characteristics in the transfer gap 6, the press covering 10 can be equipped with a specific elasticity. This elasticity optionally can be achieved using a compressible intermediate layer. This compressibility is preferably similar to or less than that of conventional rubber blankets or printing blankets that can also be used at this point. The compressibility also can be created using a conventional compressible blanket. In addition, a covering consisting of a hard blanket and a soft substrate can be used. A limited pressure surface can be supplied directly on the press cylinder 3 or the press covering 10. This limited pressure surface can be formed in the surface of the press covering 10 or it can be attached to the press cylinder 3 as a partial surface made of the same material as the press covering 10.

To improve the efficiency of the coating process, the advance of the transfer foil 5 from the foil supply roller 8 to the transfer gap 6 and to the foil collection roller 9 is controllable in such a way that the transfer foil 5 is substantially stopped when an image-forming layer is not to be transferred. In this case, the advance of the transfer foil 5 can be controlled such that the advance is stopped during passage of a gripper channel of the sheet-guiding impression cylinder 4. The grippers hold the printing sheet on the impression cylinder 4. The press cylinder 3 has a corresponding gripper channel 19 (see FIG. 3) for holding the press covering 10. In the area of the corresponding cylinder channels, the transfer foil 5 is not pressed between the press cylinder 3 (blanket cylinder) and the satellite impression cylinder 4. Instead, the press cylinder 3 continues to slide past the transfer foil 5, while the transfer foil 5 is exposed and tensioned between press cylinder 3 and satellite impression cylinder 4. This state continues until the so-called print start of the cylinder channel 19 ends and the transfer foil 5 is again clamped together with a printing sheet between the press cylinder 3 and the impression cylinder 4. The advance of the transfer foil 5 then resumes. The timing cycle for the advance of the foil can begin or stop somewhat earlier than as defined by the cylinder channel edges to accommodate any necessary acceleration or deceleration of the foil supply roller 8 or foil collection roller 9. In the case of quickly responding cycling or timing systems using so-called dancer rollers 18, such as shown in FIG. 1, control of the rotary drives 7 of the foil supply rollers 8 or foil collection rollers 9 may not be required. In such a case, the required foil tension can be maintained by using the dancer rollers 18.

The utilization of the foil can be further improved by dividing the transfer foil 5 into one or more partial foil sheets of smaller width. If each of the partial foil sheets is controlled appropriately by the feature or features for cycling or timing the advance of each of the partial foil sheets, the utilization of the transfer foil 5 can be improved for locally different length coating regions within a sheet. To do this, each partial foil sheet is conveyed in a precise manner in the region where the image-forming layer is to be applied. In the regions that are not to be coated, each partial foil sheet can be stopped independently of the other partial foil sheets so that no foil is wasted.

To further improve the coating process, dryers 16 can be provided in the vicinity of the adhesive application and in the vicinity of the foil application. In this case, the applied adhesive layer can be dried by a first dryer 16 (intermediate dryer I) using a UV drying process to obtain improved adhesion of the image-forming layer of the transfer foil 5. The adhesion of the image-forming layer on the printed sheet can be improved by using a second dryer 16 (intermediate dryer II) that further accelerates the drying of the adhesive.

Finally, the quality of the coating can be verified by an inspection or monitoring device 17 arranged after the application of the foil. For this purpose, the inspection device 17 is aligned to the sheet-carrying surface of the coating module 2 after the transfer gap 6 and, if necessary, shielded from the dryer 16. Alternatively, the inspection device 17 can be aligned with an additional sheet-carrying module connected downstream of the coating module 2. The coated printed sheet moving past this location can be checked for completeness and coating quality. Any printed sheets detected as defective can be marked or sorted out as waste in a sorting apparatus.

According to an aspect of the invention, the image-forming layer can be applied via the foil transfer device at various positions in the printing machine. In this regard, FIG. 2 illustrates a basic embodiment of an integrated foil transfer module for use in a sheet processing machine, for example, a printing machine. In this case, the coating module 2 is integrated in the structural unit, in contrast to the embodiment according to FIG. 1.

The foil transfer module of FIG. 2 includes a sheet-carrying impression cylinder 4 for the transport of printing sheets. The impression cylinder 4 can have one or more gripper fields with associated print surfaces and a corresponding, single to multiple diameter for the transport of printed sheets. An application unit 1 is associated with the impression cylinder 4 in quadrant A. The application unit 1 includes a forming cylinder 20, an application roller 21 and a dosing system 22. The application unit 1 enables image-forming coatings to be applied to printing sheets held on the impression cylinder 4 by a printing form tensioned on the forming cylinder 20.

A coating module 2 integrated into the foil transfer module is associated with the impression cylinder 4 in quadrant B. The coating module 2 is also used for foil transfer in the same manner as the embodiment according to FIG. 1. The coating module has a transfer cylinder in the form of a press cylinder 3 that forms a transfer gap 6 together with the impression cylinder 4. In addition, a foil supply roller 8, a foil collection roller 9 and possibly sheet guides are provided for guiding the foil sheet or transfer foil around or tangentially past the application roller 21. The cylinders can correspond to the forming cylinder and the impression cylinder of a coating module of an offset printing machine.

A calendaring unit can be assigned to the impression cylinder 4 and connected downstream of the coating module 2 in the direction of rotation. A calendaring roller and the impression cylinder 4 form a calendaring gap.

In this manner, an integrated foil transfer module is formed that has two operating stations that can be used as follows to transfer an image-forming layer from a transfer foil to a printing sheet. A printing sheet to be coated is first run into the first work station (application unit 1). In a print gap between the forming cylinder 20 and the satellite impression cylinder 4, the printing sheet is provided with an imaging adhesive pattern. The adhesive pattern is applied from the dosing system 22 via the application roller 21 to the printing form of the forming cylinder 20. Next, in the following work station (i.e., coating module 2) the printing sheet is guided together with a sheet of transfer foil 5 through the transfer gap 6 between the press cylinder 3 and the impression cylinder 4, whereby the transfer foil 5 is pressed against the printing sheet. Due to this compression, an image-forming layer is transferred from the transfer foil 5 to the printed sheet in the area of the adhesive pattern. In this case, the sheet of transfer foil 5 is unwound from the foil supply roller 8 in the rotational direction of impression cylinder 4 and moves around the press cylinder 3 or past it in a roughly tangential manner. The transfer foil is then wound on the foil collection roller 9. The image-forming layer transferred from the transfer foil 5 to the printed sheet can be rolled further the downstream-connected calendaring unit to increase the adhesion strength and smoothness.

The integrated foil transfer module can be used in a varnishing module of a sheet printing machine as it already has all the required elements in its basic design. In such a case, an ink chamber blade system can be used for the dosing of adhesive as opposed to varnish. The dosing of the adhesive can use the screen roller or application roller and the forming cylinder, e.g., via a partial blanket or a flexographic print form on the printing material. This type of foil transfer module moves the printing material in a very advantageous manner through all required gap sites in a single gripper jaw while the printing material rests upon a single satellite impression cylinder 4.

The coating module 2 is designed to provide a printing sheet with an image-forming layer, e.g., a metallic layer before it is printed upon. The coating module 2 itself can also be placed at any desired location within the sheet processing machine. This allows the desired image-forming layers, such as metallic layers, to be applied before and after, as well as between, the applications of the printed ink layers.

Advantageously, the coating module can be designed as a transportable unit. In particular, the coating module can consist of a frame with a foil unwinding apparatus and a foil winding apparatus. For coupling to the particular printing unit, the coating module has a coupling surface at a defined area of the required printing unit. The corresponding and opposing surface normally rests against the top side of the required printing unit. The coupling surface can also be located to the side or at the front sides of the printing units.

The application unit 1 can be set-up for applying adhesive in the same manner as common used to set up a printing unit for standard ink application. Moreover, the foil transfer apparatus required near the foil supply roller or foil collection roller can be associated with the coating module. Only in the area of the protection elements of the printing units are appropriate inlets and outlets provided for the supply of the transfer foil 5 to the press cylinder and the withdrawal of the transfer foil 5 from the press cylinder 3. The transfer foil bypass required in the area of the protection elements can be connected in a simple and detachable manner with the protection elements, if necessary.

Using the FIG. 2 embodiment, it is also possible to provide several coating modules 2 one after the other in a sheet processing machine. With such an arrangement, different imaging layers or metallic layers within a particular image design can be applied by introducing the various required transfer foils to the printed sheet in sequence. Thus, it is possible to apply a single adhesive pattern in an application unit 1 which would correspond to all the necessary image patterns for desired image design. The different foil images can then be transferred in sequence in the following coating modules 2.

On the other hand, the transfer of a first adhesive pattern can take place in a first application unit 1 with a first type of metallic layer provided by a first coating module 2. In a following application unit 1, an additional adhesive pattern can then be applied that encloses or overlaps the first adhesive patter can be applied. Then, in a second coating module 2, a second type of metallic layer can be applied. In this way, for example, interpenetrating image patterns of a silver-colored layer and a gold-colored layer can be produced in one coating step.

Figure 3:
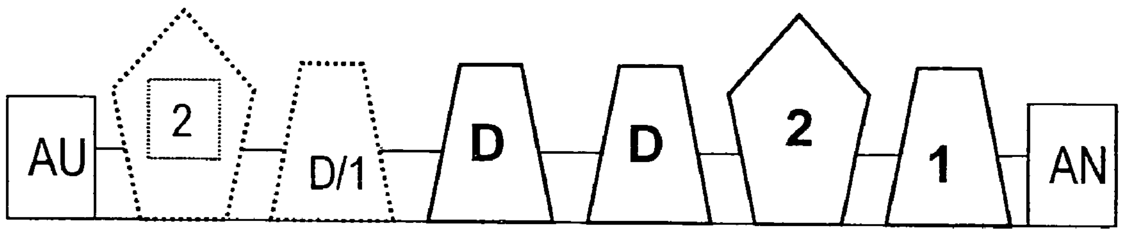
FIGS. 3-6 are schematic drawings showing various different ways in which a foil transfer module according to the invention can be integrated into a printing machine.

FIGS. 3-6 illustrate schematically several different possible embodiments of how coating modules 2 and application unit 1 can be integrated into a printing machine. FIG. 3 shows a basic conventional configuration. First, an application unit 1 is connected downstream of a feed unit AN of the sheet printing machine, and then to a coating module 2. Printing units D of the sheet printing machine then follow the coating module 2. A sheet delivery unit AU completes the configuration. With this configuration, an image-forming coating with metallic foil can be provided on the blank printing sheet. A multiple colored printed pattern can then be applied over this coating. Likewise, a complete coating with metallic foil can be produced using the coating module 2 that can be subsequently overprinted in the printing units D. FIG. 3 shows that a coating module 2 can also be connected downstream to the printing units D before the sheet delivery unit AU, and the printing unit D connected upstream to the coating module 2 can act as application unit 1. This allows, for example, a subsequent lamination or application of a metallic imaging coating without overprinting. In such a case, the color print should be dried first.

Figure 4:
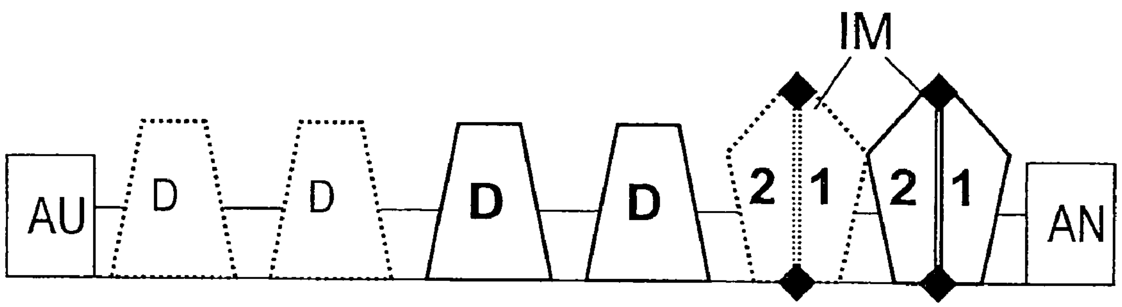

FIG. 4 illustrate a configuration comparable to that of FIG. 3. However, in FIG. 4, two foil transfer modules are connected downstream of the feed unit AN as integrated foil transfer modules IM. In this case, both a coating module 2 and an associated application unit 1 are present within one working unit (see also FIG. 2). Thus, as described above, the image application can be performed by two different side-by-side coatings within or overlapping each other. The arrangement with an integrated coating module IM has particular utility if at least two foil transfer modules are positioned one after the other.

Figure 5:
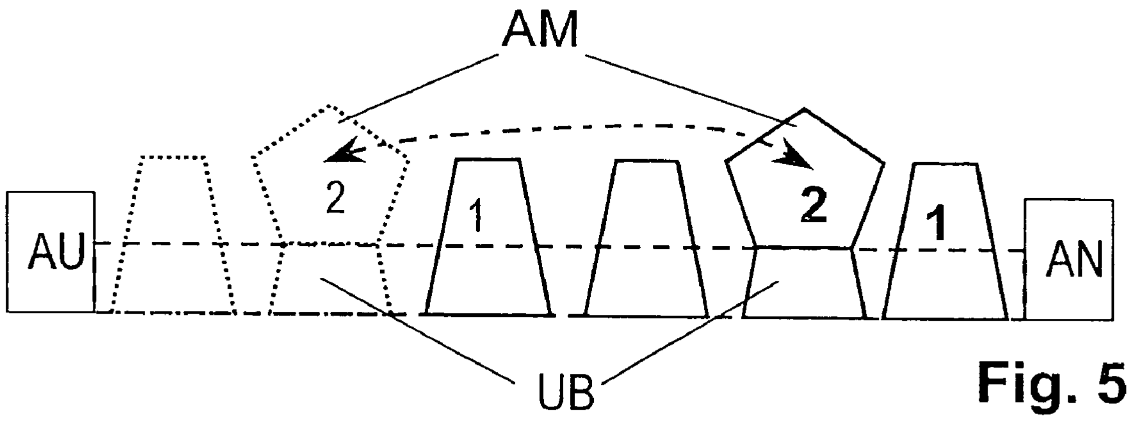

FIG. 5 illustrates a flexible variant for a printing machine that has further improvements with respect to additional processing of printing sheets. In this case, the foil transfer module is designed as a lifting apparatus AM. A lifting apparatus AM of this kind is preferably designed as a portable unit and can be set upon a standardized substrate UB of a printing unit D of the printing machine. In this case, corresponding coupling mechanisms are required that can be configured in various ways. Typically, the substrate UB contains a frame in which a sheet transport drum and an impression cylinder 4 are arranged. If necessary, a blanket cylinder 13 of an offset printing unit or a forming cylinder 20 of a varnish module may be located on the substrate and assigned to the satellite impression cylinder 4. The blanket cylinder 13 or forming cylinder 20 can be used in conjunction with the coating module 2 as the press cylinder 3. A corresponding press covering 10 also can be used. Corresponding tensioning mechanisms are provided on both types of cylinders.

Figure 6:
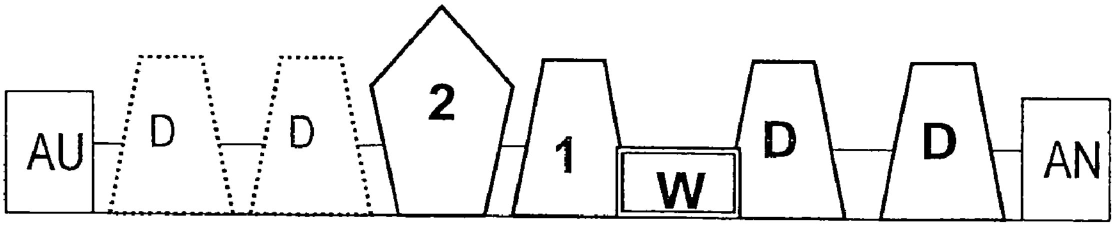

A further refined design is shown in FIG. 6. The printing machine shown in FIG. 6 has two printing mechanisms D adjoining the feed unit AN followed by a so-called turning unit W. Turning units W are used in the sheet feed unit of a sheet printing machine to turn over a printed sheet that has been printed or coated on one side, so that its opposing side can then be printed or coated. In the illustrated configuration, an application unit 1 and a coating module 2 follow the turning unit W. Next, several additional printing units D are provided to the sheet delivery AU. With this type of printing machine, each printed sheet can first be printed in one or two colors on its back side, then turned over, coated with a metallic image-forming layer, and then again printed in several colors. Greeting cards with an ornamental inlay of metal foil on the image side are one possible application.

The illustrated configurations are presented as examples. Within the framework of modularizing of the foil transfer modules, as described in detail above, one skilled in the art can readily find additional possible applications.

LIST OF REFERENCE SYMBOLS

1 Application unit
2 Coating module
3 Press cylinder
4 Satellite impression cylinder
5 Transfer foil/foil sheet
6 Transfer gap
7 Roller drive
8 Foil supply roller
9 Foil collection roller
10 Press covering
11 Inking/dampening unit
12 Plate cylinder
13 Blanket/rubber cylinder
14 Foil guide unit
15 Printing mechanism
16 Dryer
17 Inspection unit/monitoring system
18 Dancer roller
19 Cylinder duct
20 Forming cylinder
21 Application roller
22 Dosing system
D Printing mechanism
W Turning unit
AN Feed unit
AU Sheet delivery unit
UB Substrate
IM Integrated foil transfer module
AM Lifting apparatus

The invention claimed is:

1. A sheet fed offset printing machine for printing and processing sheets comprising:

a plurality of sheet fed offset printing units each including an arrangement of a plate cylinder adapted for carrying a printing plate, a blanket or press cylinder in adjacent contacting relation to the plate cylinder, and an impression cylinder free of contact with the plate cylinder in adjacent contacting relation to the blanket or press cylinder for defining a sheet passage nip therebetween, one of said printing units being a coating printing unit having a supply of adhesive material and the plate cylinder and blanket cylinder of said coating printing unit being operable for applying an image forming adhesive coating onto sheets passing through the sheet passage nip of the one printing unit, and one of said printing units having an integrated transfer foil apparatus comprising a structural unit that includes a transfer foil supply apparatus, a consumed transfer foil removal apparatus, and guide elements for guiding the transfer foil to and away from sheets passing through a sheet passage nip defined in part by the impression cylinder of the printing unit with which the transfer foil apparatus is integrated whereby a film image is applied on the sheets by the transfer of at least parts of an image forming layer of the transfer film onto the sheets.

2. The sheet fed offset printing machine according to claim 1 wherein the transfer foil supply apparatus comprises a foil supply roller having an associated rotary drive and the consumed foil removal apparatus comprises a foil collection roller having an associated rotary drive.

3. The sheet fed offset printing machine according to claim 2 in which a plurality of said printing units are operable for producing a colored imprint.

4. The sheet fed offset printing machine according to claim 3 in which said coating printing unit and said transfer foil apparatus comprise a coating module.

5. The sheet fed offset printing machine according to claim 4 wherein the coating module is connected downstream of the plurality of printing units so as to be able to perform a lamination on the colored imprint.

6. The sheet fed offset printing machine according to claim 4 wherein the coating module is connected upstream of the plurality of printing units.

7. The sheet fed offset printing machine according to claim 4 wherein the plurality of printing units are arranged one after the other with a turning unit being arranged between one adjacent pair of printing units for turning over printing sheets in order to print the a front side and a back side, the coating module being arranged downstream of the turning unit.

8. The sheet fed offset printing machine according to claim 4 wherein the coating module is one a plurality of coating modules arranged one after the other within the sheet-processing apparatus.

9. The sheet fed offset printing machine according to claim 8 wherein at least two adjacent coating modules are configured as an integrated operating unit.

10. The sheet fed offset printing machine according to claim 9 including a plurality of said coating modules.

11. The sheet fed offset printing machine according to claim 4 wherein the coating module is a varnishing coating module.

12. The sheet fed offset printing machine according to claim 4 wherein the coating module is configured as a printing sheet lifting apparatus.

13. The sheet fed offset printing machine according to claim 1 in which the printing unit with which said transfer foil apparatus is integrated is different from said coating printing unit.

14. The sheet fed offset printing machine according to claim 13 in which a press cylinder of said printing unit with which said transfer foil apparatus is integrated and the impression cylinder of said printing unit define the sheet passage nip within which the film image is supplied to sheets by the transfer foil.

15. The sheet fed offset printing machine according to claim 1 in which said integrated transfer foil apparatus is a part of said coating printing unit and is operable for causing the film image to be applied on sheets after the application of the image forming adhesive coating on the sheets by said coating printing unit.

16. The sheet fed offset printing machine according to claim 15 in which said transfer foil apparatus includes a press cylinder that defines a nip with the impression cylinder of the coating printing unit with which the transfer foil is integrated through which the transfer foil and sheets pass in contacting relation to each other.

17. The sheet fed offset printing machine according to claim 15 in which said coating module is a structural unit that is transportable and selectively connectable between selected printing units of the printing machine.

* * * * *